US007027500B1

(12) United States Patent
Casas et al.

(10) Patent No.: US 7,027,500 B1
(45) Date of Patent: Apr. 11, 2006

(54) LINEAR PREDICTION BASED INITIALIZATION OF A SINGLE-AXIS BLIND EQUALIZER FOR VSB SIGNALS

(75) Inventors: Raúl A. Casas, Doylestown, PA (US); Azzédine Touzni, Doylestown, PA (US); Thomas J. Endres, Kent, WA (US); Stephen L. Biracree, Jamison, PA (US); Christopher H. Strolle, Fort Washington, PA (US); Samir N. Hulyalkar, Newtown, PA (US)

(73) Assignee: ATI Research, Inc., Santa Clara, CA (US)

( * ) Notice: Subject to any disclaimer, the term of this patent is extended or adjusted under 35 U.S.C. 154(b) by 714 days.

(21) Appl. No.: 10/016,665

(22) Filed: Dec. 11, 2001

Related U.S. Application Data

(60) Provisional application No. 60/254,829, filed on Dec. 12, 2000.

(51) Int. Cl.
H03K 5/159 (2006.01)

(52) U.S. Cl. .................. 375/232; 708/323; 348/607
(58) Field of Classification Search ........ 375/229–236, 375/326, 350, 341, 287, 340, 348, 261; 329/304; 333/28 R; 708/300, 323; 360/65; 348/726, 348/614, 727, 607, 725
See application file for complete search history.

(56) References Cited

U.S. PATENT DOCUMENTS

| 5,872,815 A | 2/1999 | Strolle et al. |
| 5,909,466 A | 6/1999 | Labat et al. |

(Continued)

OTHER PUBLICATIONS

Hardware architectures of adaptive equalizers for the HDTV receiver; Seung Soo Chae, et al; Signal Processing, IEEE Transactions on, vol.: 46, Issue: 2, Feb. 1998 pp.: 391-404.*

(Continued)

Primary Examiner—Temesghen Ghebretinsae
Assistant Examiner—Jacob Meek
(74) Attorney, Agent, or Firm—Steve Mendelsohn

(57) ABSTRACT

A single-axis receiver processing, for example, complex vestigial sideband modulated signals with an equalizer with forward and feedback filters. Forward and feedback filters have parameters that are initialized and adapted to steady state operation. Adaptive equalization employs linear predictive filtering and error term generation based on various cost criteria. Adaptive equalization includes recursive update of parameters for forward and feedback filtering as operation changes between linear and decision-feedback equalization of either single or multi-channel signals. An adaptive, linear predictive filter generates real-valued parameters that are employed to set the parameters of the feedback filter. In an initialization mode, filter parameters are set via a linear prediction filter to approximate the inverse of the channel's impulse/frequency response and a constant modulus error term for adaptation of the filter parameters. In an acquisition mode, equalization is as linear equalization with a constant modulus error term, and possibly other error terms in combination, for adaptation of the filter parameters. In a tracking mode, equalization is as decision feedback equalization with decision-directed error terms for adaptation of the filter parameters. For some equalizer configurations, feedback filtering is applied to real-valued decisions corresponding to complex-valued received data, and includes real-part extraction of the error term employed for recursive update of filtering parameters. Where a training sequence is available to the receiver, initial parameters for forward filtering are estimated by correlation of the received signal with the training sequence.

38 Claims, 9 Drawing Sheets

U.S. PATENT DOCUMENTS

| | | | | |
|---|---|---|---|---|
| 5,930,296 | A * | 7/1999 | Kot | 375/233 |
| 6,240,133 | B1 * | 5/2001 | Sommer et al. | 375/232 |
| 6,313,885 | B1 * | 11/2001 | Patel et al. | 348/725 |
| 6,370,191 | B1 * | 4/2002 | Mahant-Shetti et al. | 375/233 |
| 6,668,014 | B1 * | 12/2003 | Endres et al. | 375/232 |
| 6,724,844 | B1 * | 4/2004 | Ghosh | 375/350 |
| 6,775,322 | B1 * | 8/2004 | Zangi et al. | 375/232 |
| 6,775,334 | B1 * | 8/2004 | Liu et al. | 375/341 |
| 6,816,548 | B1 * | 11/2004 | Shiue et al. | 375/233 |
| 6,842,495 | B1 * | 1/2005 | Jaffe et al. | 375/326 |
| 2002/0054634 | A1 * | 5/2002 | Martin et al. | 375/232 |

OTHER PUBLICATIONS

A decision-directed constant modulus algorithm for higher-order source constellations; Endres, T.J., et al; Acoustics, Speech, and Signal Processing, 2000. ICASSP '00. Proceedings. 2000 IEEE Int'l Conference on, vol. 6, Jun. 5-9, 2000 pp.: 3382-3385.*

"Phase recovery based on minimization of Single-Axis Constant Modulus criterion: Performance analysis" by A. Touzni, et al., 2001 Conference on Information Sciences and Systems, The John Hopkins University, Mar. 21-23, 2001.

"A New Approach to Multipath Correction of Constant Modulus Signals" by John R. Treichler and Brian G. Agee, IEEE Transactions on Acoustics, Speech, and Signal Processing, vol. ASSP-31, No. 2, Apr. 1983; pps. 459-471.

"Global Convergence of a Single-Axis Constant Modulus Algorithm" by A. Shah, et al., *Proceedings of the Statistical Signal and Array Processing Workshop,* Pocono Manor, PA, Aug. 2000.

"Self-Recovering Equalization is Two-Dimensional Data Communications Systems" by D. N. Goddard, *IEEE Transactions on Communications,* Oct. 1980, vol. 28, No. 11, pps. 1867-1875.

* cited by examiner

LINEAR PREDICTION BASED INITIALIZATION OF A SINGLE-AXIS BLIND EQUALIZER FOR VSB SIGNALS

CROSS-REFERENCE TO RELATED APPLICATIONS

This application claims the benefit of the filing date of U.S. provisional application No. 60/254,829, filed on Dec. 12, 2000.

BACKGROUND OF THE INVENTION

1. Field of the Invention

The present invention relates to equalizers, and more particularly, to blind equalization of digital data in a receiver of a digital communications system.

2. Description of the Related Art

In many digital communications systems, a source generates digital information for transmission to multiple destination receivers. A transmitter processes the digital information into an encoded (e.g., error-correction encoded) and/or packetized stream of data. The stream of data is then divided into discrete blocks. Each of the blocks is mapped onto a corresponding sequence of code or symbol values ("symbols") chosen from a pre-defined alphabet A, and generated with a period $T_s$, sometimes referred to as the "baud" period. Symbols may be modulated onto an analog, e.g., radio frequency (RF), carrier, in amplitude, phase, and/or frequency prior to physical transmission through the communication medium. Many methods of mapping exist and are well known in the art, and these pre-defined alphabets are generated based on certain criteria. For example, data may be mapped onto symbols of a complex data stream as pairs of in-phase (I) and quadrature phase (Q) component values that are subsequently modulated with an RF carrier.

A receiver performs several functions to demodulate and decode a received signal. Receiver functions include, for example, tuning and RF demodulation of the received signal to an intermediate frequency (IF) signal, synchronization with the RF carrier in frequency and phase, equalization, symbol detection, and decoding.

FIG. 1 shows a typical prior art communication system 100 that may be employed for transmission and reception of digital television signals. Communication system 100 comprises transmitter 101 transferring signals through transmission medium 102 to receiver 103. Transmitter 101 comprises digital encoding system 111, premodulator/pulse shaper 112, radio frequency (RF) upconverter 113, carrier oscillator 115, and transmit antenna 114. Transmitter 101 receives user data from information source 110 (such as video, audio, and/or computer files) coupled to digital encoding system 111. Digital encoding system 111 may provide analog-to-digital (A/D) conversion, error-correction encoding, and/or bit-to-symbol mapping to generate a sequence of symbols selected from a predetermined alphabet. For example, data may be mapped into a complex-valued signal stream with pairs of in-phase (I) and quadrature phase (O) components. Digital encoding system 111 provides the symbols to pre-modulator/pulse shaper 112. Pre-modulator/pulse shaper 112 modifies the symbols for the particular type of modulation, and may include a filter for pulse shaping of the symbols. The signal generated by pulse shaper 112 is provided to RF upconverter 113 which i) uses the signal to modulate a complex radio frequency (RF) carrier provided by carrier oscillator 115, and ii) amplifies and filters the signal. The modulated and amplified RF carrier is then emitted into the transmission medium 102 as an RF signal via transmit antenna 114.

Various modulation techniques, such as quadrature amplitude modulation (QAM), phase-shift keyed (PSK) modulation, or vestigial sideband (VSB) modulation are known in the art of communications to modulate the carrier. For example, modulation formats such as VSB are common formats used for transmission of digital television signals in accordance with, for example, the ATSC standard for digital television, "ATSC Digital Television Standard," Doc. A/53B, August 2001.

For these modulation techniques, a quadrature oscillator may be employed with a complex RF upconverter in the modulator. The I signal component modulates the cosine component generated by the oscillator and the Q signal component modulates the sine component of the oscillator. VSB modulation is a form of single-sideband modulation in which the redundant sideband of a real-valued signal is removed in full by filtering, except for a small vestige of the redundant sideband. For complex VSB modulation, a complex signal is formed with the Q component being approximately the Hilbert transform of the I component. The Q-component thus contains no additional user information.

The modulated carrier signal transmitted through the medium 102 (which may be, e.g., terrestrial, cable, underwater, wire, optical fiber, atmosphere, space, etc.) comprises a series of analog pulses, each analog pulse being amplitude and/or phase modulated by a corresponding symbol in the sequence. The pulse shape used typically extends many symbol periods in time. This introduces the possibility of adjacent pulses corrupting each other, a phenomenon known as inter-symbol interference (ISI). Most propagation media introduce signal distortion, and factors that cause distortion include additive noise (static), signal strength variations (fading), phase shift variations, and multiple path delays (known as multipath). Multipath also causes ISI distortion when multiple versions of the transmitted signal, weighted and delayed differently by each path, are combined at the receiver sensor. In addition, front-end circuitry of the receiver and transmitter also introduce distortion and noise to the signal. The presence of distortion, noise, fading and multipath introduced by the overall communication channel (transmitter, receiver and propagation medium) can cause digital systems to degrade or fail completely when the bit error rate exceeds some threshold and overcomes the error tolerance of the system. Since digital systems transmit data as symbols having discrete levels of amplitude and/or phase, to the extent that a symbol is received at a level that differs from one of the allowed discrete levels, a measure of communication channel error and/or frequency response may be detected.

Returning to FIG. 1, receiver 103 includes antenna 120 receiving the signal from the medium 102, complex demodulator and sampler 121, timing recovery module 122, equalizer 123, detector 150, and carrier recovery module 124. Carrier recovery module 124 includes reference generator 126 and phase detector 125. Complex demodulator and sampler 121 translates the received signal from RF to intermediate frequency (IF), and performs complex demodulation of the received signal at IF to near baseband employing the locally generated reference for the carrier signal. Complex demodulator and sampler 121 also samples the signal based on an estimate of the symbol period. Timing recovery module 122 estimates the symbol timing period $T_s$, and this estimate may be fed back to complex demodulator and sampler 121 to adjust the sampling rate (e.g., via a sampling phase error). Timing recovery thus synchronizes sampling instances to the top-dead-center of the pulse shapes, and then tracks variations in the detected period and phase of $T_s$.

Equalizer 123 applies equalization to the received samples to suppress the effects of ISI, caused by phenomena such as i) residual timing error, ii) pulse shape/multipath distortion from the propagation channel, and/or iii) approximation of the ideal transmit and receive filters for ease of implementation. Carrier recovery module 124 generates estimates for the difference in frequency and phase (collectively referred to as angle θ) of the carrier used to modulate the symbols and the locally generated reference used for demodulation. Detector 150, typically implemented with a slicer, examines each sample to generate either a soft or hard decision for the symbol that corresponds to the sample. A slicer is a decision device that, responsive to the signal at its input, generates the projection of the nearest symbol value to the input signal from the grid of constellation points. The output of the slicer thus corresponds to one of the allowed, discrete levels. More complicated implementations of the slicer exploit channel coding and do not necessarily make nearest element decisions. Carrier recovery 124 module may use decision from detector 150 to estimate angle θ. After symbol detection, a decoder 151 reconstructs the transmitted data from the symbol sequence.

Equalizer 123 may be implemented as a filter that has the inverse characteristics of the communication channel. An estimate of the transmission characteristics of the communication channel (transfer function or impulse response) is either known or measured, and the equalization filter parameters may be set indirectly based on the estimate. The received signal is then passed through the equalizer, which compensates for the non-ideal communication channel by introducing "distortions" into the received signal which tend to cancel the distortions introduced by the communication channel.

For some digital transmission applications, such as digital television broadcasting, each receiver is in a unique location with respect to the transmitter. Accordingly, the characteristics of the communication channel are not known in advance, and may even change over time. For these applications, equalizer 123 may typically be an adaptive equalizer. An adaptive equalizer has variable filter parameters, or filter coefficients ("taps"), that are calculated by the receiver, and prior art includes many methods for adjusting the equalizer filter parameters to restore signal quality to a performance level acceptable by subsequent error-correction decoding.

In some systems including an adaptive equalizer, the parameters of the equalizer filter(s) are set using a predetermined reference signal transmitted with the data, sometimes referred to as a training sequence. The training sequence is periodically sent from the transmitter to the receiver, which compares the received and known training sequence to derive parameters of the equalizer filter(s). After several iterations (adaptively deriving the parameters over successive training sequences), the equalizer filter parameters converge to a setting that tends to compensate for the distortion characteristics of the communications channel. Periodic re-training may be employed to track variations in the channel characteristics over time.

In blind equalization, the equalizer filter parameters are derived from the received signal itself, rather than by using a training sequence. In the prior art, it is known to adjust the equalizer parameters blindly based on an error term generated with the Least Mean Squares (LMS) method. For this blind equalization, either soft or hard decisions, or best estimates, of the original input symbols, are compared with the equalizer's output signal to derive parameters of the equalizer filter(s). Blind equalization systems using the LMS algorithm in this manner with hard decisions are referred to as decision-directed (DD) systems. Other systems employ a combination of both trained and blind methods: the equalizer coefficients may be updated blindly with DD between periodic training sequence transmissions.

The DD algorithm requires a relatively "good" initial estimate of the actual values within the signal input to the receiver. However, as is the case for most communication channel conditions, a relatively poor initial estimate results in high decision error rates. Decision errors cause the successively calculated equalizer filter parameters to diverge. When the parameters diverge, they fluctuate (e.g., bounce between the maximum and minimum values), rather than converge to parameters approximating the inverse of the channel characteristics. Adaptive equalizers may use other blind cost criteria to derive parameters for the equalizer's filters.

One such blind cost criterion known in the art for adaptive equalization is the constant modulus (CM) criterion. The stochastic gradient descent of the CM criterion is known as the Constant Modulus Algorithm (CMA). The CMA algorithm is described in an article by D. N. Godard entitled "Self-Recovering Equalization in Two-Dimensional Data Communication Systems," IEEE Transactions on Communications, vol. 28, no. 11, pp. 1867–1875, October 1980, which is incorporated herein by reference. The CM criterion and CMA algorithm were further developed to de-couple equalization and carrier recovery functions in a receiver. Such use of the CM criterion and CMA algorithm for equalization is described in J. R. Treichler et al., "A New Approach to Multipath Correction of Constant Modulus Signals," IEEE Transactions on Acoustics, Speech, and Signal Processing, vol. ASSP-31, no. 2, April 1993, which is incorporated herein by reference. Systems that make use of the CMA algorithm for adaptive equalization, are described in U.S. Pat. No. 5,872,815 to Strolle et al.

The CM criterion penalizes the deviation of i) the dispersion of the magnitude squared of the equalizer output from ii) a pre-calculated constant referred to as the "dispersion constant" or the "Godard radius." FIGS. 2A and 2B illustrate that the CM criterion is based on deviation from a "radius" about the origin of, for example, a source constellation. FIG. 2A shows a radius 201 of an 8-PSK (phase-shift keyed) constellation plotted for real (e.g., Re or I) and imaginary (e.g., Im or Q) components. In FIG. 2A, each point (symbol) lies on the circle 204 defined by this radius 201 (termed a constant modulus system), and the CM criterion penalizes distance of a received sample (e.g., sample 202) from this circle 204. Even though the constellation may rotate, the constellation remains on the circle, and so applying a CM criterion to this constellation does not penalize spatial rotation of the constellation, for example due to residual carrier offset. FIG. 2B shows a 16-QAM constellation plotted for real and imaginary components. In FIG. 2B, groups of points (symbols) lie on corresponding concentric circles 211, 212, and 213. The CM criterion defines a radius 214 of circle 215, which is not necessarily a radius of one of the concentric circles 211, 212, and 213 (termed non-constant modulus), as a "common" radial distance from the origin for the points of the constellation. As with the constellation of FIG. 2A, the CM criterion penalizes distance of a received sample (e.g., sample 203) from this circle 215.

The CM criterion defines a cost function $J_{CM}$ that may be expressed as given in equation (1):

$$J_{CM} = E[(\rho^2 - |y_n|^2)^2] \quad (1)$$

where $E[\bullet]$ denotes the expected value operator, $\rho^2$ is the dispersion constant (Godard radius), and $y_n$ is the equalizer output. The dispersion constant $\rho^2$ is a quantity that can be determined from the type of modulation employed (e.g., QAM, BPSK, etc.). The dispersion constant $\rho^2$ may be derived by calculation, by experiment, or by a combination of both for a particular implementation. The equalizer output, $y_n$, is a function of the received data and several parameters in the receiver chain, including timing phase, equalizer filter coefficients and carrier loop derotation angle. Hence, various combinations of these parameters may be adjusted to minimize CM cost and consequently recover the transmitted symbols.

For a single-axis modulated source such as a VSB modulated source, the CM criterion may be modified by taking the real part of $y_n$ in equation (1). The modified CM criterion is referred to as the single-axis CM (SA-CM) criterion, and is given in equation (2).

$$J_{SA-CM} = E[(\rho^2 - Re\{y_n\}^2)^2] \quad (2)$$

where $Re\{\bullet\}$ denotes the real-part extraction.

Given a defined cost function, the gradient of the cost function may be derived. The stochastic gradient is an approximation of the true gradient given by the instantaneous derivative of the cost function without taking the expected value. For example, the stochastic gradient of the SA-CM criterion is known as SA-CMA and is derived by taking the derivative of equation (2) with respect to the parameters of interest. Once the derivative is calculated, an error term may be defined that tends to drive the parameters to a relative minimum.

Another prior art blind equalization method employs a linear prediction (LPR) based method in conjunction with the CMA based method to adaptively set filter parameters, such as described in U.S. Pat. No. 5,909,466 to Labat et al., issued Jun. 1, 1999 ("Labat"). Blind equalization comprises two parts, and operates in the frequency domain on the input signal as follows. An LPR filter first applies amplitude equalization for the magnitude of the channel's frequency response. The LPR filter is adapted to minimize the power of its output x(n), and therefore has an output power (OP) criterion $$J_{OP} = E[|X(n)|^2].$$

The LPR filter is followed by a filter with parameters adapted based on a complex-valued CM error term (e.g., generated with the CMA method) that corrects for the phase of the channel's frequency response. The LPR filter may be implemented as a finite impulse response (FIR) or more typically, as an infinite impulse response (IIR) filter via with a feedback filter.

In Labat, the combined method of blind equalization of complex signals with both LPR and CMA methods is employed during a coarse initialization mode to initialize, adapt, and converge the equalization filter parameters for modulations such as PAM, QPSK, and QAM. The combined method of blind equalization is employed from the point of initially receiving the signal (i.e., a "cold start"). Once it is determined that forward and feedback filter parameters are sufficiently close to the desired solution, the equalizer is configured to operate as a decision feedback equalizer (DFE). The DFE uses a forward FIR filter operating on the received signal combined with a feedback filter operating on past hard decisions for symbols. Blind adaptation of a DFE is typically difficult to accomplish accurately due to a phenomenon known as error propagation, where incorrect symbols that are propagated through the feedback filter path cause further symbol errors, yielding error bursts. Error bursts may cause the filter parameters to diverge. Thus, the LPR method is used to initialize the feedback filter parameters while the CMA method is used to initialize the forward filter parameters.

After the coarse initialization mode, some systems with a forward FIR filter followed by a feedback IIR filter use a hybrid architecture that switches between the DFE configuration and a linear equalizer (LE) configuration. Typically, the adaptation algorithm and equalizer structure modes should then smoothly transition from acquisition mode, where the CMA method is used to adapt the LE filter parameters, to tracking mode, where a DD method is used to update the DFE filter parameters. Such hybrid architecture is described in, for example, U.S. patent application Ser. No. 09/549,368 to T. J. Endres et. al. entitled "A Hybrid Soft and Hard Decision Feedback Equalizer," filed on Apr. 14, 2000, which is incorporated herein by reference.

Many receivers employ diversity combining, where different received signal streams (e.g., different multipath signals) are combined within the equalizer itself prior to generating symbol estimates. A typical diversity receiver with feedback applies different forward filters to each received signal stream and additively combines the forward filter output signals. This combined output signal is then passed through a single feedback filter, which may be either a linear feedback filter or a decision feedback filter. Systems possessing diversity combining are also known as multichannel systems. Two well-known types of diversity are spatial and temporal diversity. Spatial diversity results from the use of multiple sensors (for example, antennas for terrestrial broadcasting). Temporal diversity results from sampling signals at rates faster than the transmitted symbol rate. Equalizers that use temporal diversity are known as fractionally spaced equalizers.

Another form of diversity is phase diversity, which arises when a real-valued data source, such as a pulse amplitude modulated (PAM) or a Vestigial Sideband (VSB) modulated source, is processed at the receiver using complex-valued filtering. An optimal minimum mean square error (MMSE) receiver for estimating the received, complex VSB signal comprises a complex-valued forward filter (i.e., a filter operating on complex signals), followed by a real-valued feedback filter (i.e., a filter operating only on the real component of the forward filter output). This type of equalizer is termed a single-axis equalizer and is described in, for example, A. Shah et al., "Global convergence of a single-axis constant modulus algorithm," Proceedings of the Statistical Signal and Array Processing Workshop, Pocono Manor, Pa., August 2000 which is incorporated herein by reference.

SUMMARY OF THE INVENTION

The present invention relates to initialization and adaptive equalization to steady state operation in a single-axis receiver. Adaptive equalization employs linear predictive filtering and error term generation based on various cost criteria. Adaptive equalization includes recursive update of parameters for linear prediction filtering, and for forward and feedback filtering as operation changes between linear and decision-feedback equalization. An adaptive, linear predictive filter generates parameters that are employed to set the parameters of the feedback filter. Feedback filtering is applied to real-valued decisions corresponding to complex-valued received data, and includes real-part extraction of the error term employed for recursive update of filtering parameters. For some embodiments of the present invention, where a training sequence is available to the receiver, estimate initial parameters for forward filtering by correlation of the training sequence with the output of the linear predictive filter. Some embodiments of the present invention employ unbiased slicing of the equalized, received signal, and some embodiments of the present invention employ scaling of signals prior and/or subsequent to feedback filtering.

In accordance with an exemplary embodiment of the present invention, equalization of a complex-valued signal, the signal being single-axis (SA) modulated data includes applying a linear predictive (LPR) filter characterized by a set of real-valued LPR parameters to the signal and recursively updating the set of LPR parameters based on one or more error terms to minimize output power of the LPR-filtered signal. Either linear equalization (LE) or decision feedback equalization (DFE) is employed to apply an estimate of the inverse channel characteristics to the received signal to generate an equalized signal, wherein equalization is applied with a forward (FW) filter characterized by a set of FW filter parameters, and a feedback (FB) filter characterized by a set of FB filter parameters. Hard decisions for the data of the equalized signal are generated. The set of FB parameters are initialized by the set of real-valued LPR parameters, and the set of FW parameters are initialized with either a predetermined impulse response or an estimate of the channel response. The set of FW parameters and the set of FB parameters are recursively updated based on one or more error terms, wherein one or more error terms are generated from a blind cost criterion based on real-part extraction.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

The present invention relates to initialization and adaptive equalization to steady state operation in a single-axis receiver. Adaptive equalization employs linear predictive filtering and error term generation based on various cost criteria. Adaptive equalization includes recursive update of parameters for forward and feedback filtering as operation changes between linear and decision-feedback equalization. An adaptive, linear predictive filter generates parameters that are employed to initially set the parameters of the feedback filter. Equalization of received signals occurs through three distinct modes of operation. In an initialization mode, filter parameters are set via an adaptive linear prediction filter to approximate the inverse of the magnitude of the channel's frequency response. The linear predictive filter uses real-valued parameters, and is adapted using real-valued error terms. The real-valued parameters of the linear predictive filter are then copied to the feedback filter to initialize the feedback filter. The feedback filter requires real-valued filter parameters due to the nature of single-axis modulation and equalization. The real-valued constraint on the filter parameters and on the stochastic gradient algorithm achieves the preferred LPR filter function for complex-valued processing of single-axis signals, and in particular, VSB modulated signals. Further embodiments of the present invention, where a training sequence is available to the receiver, estimate initial parameters for forward filtering during the initialization mode by correlation of the received signal with the training sequence.

In an acquisition mode, equalization is configured as linear equalization with a constant modulus error term, and possibly other error terms in combination, for adaptation of the filter parameters. In a tracking mode, equalization is configured as decision feedback equalization with decision-directed error terms and possibly other error terms in combination for adaptation of the filter parameters. Other embodiments employ unbiased slicing and/or regularized decision feedback equalization.

Figure 1:
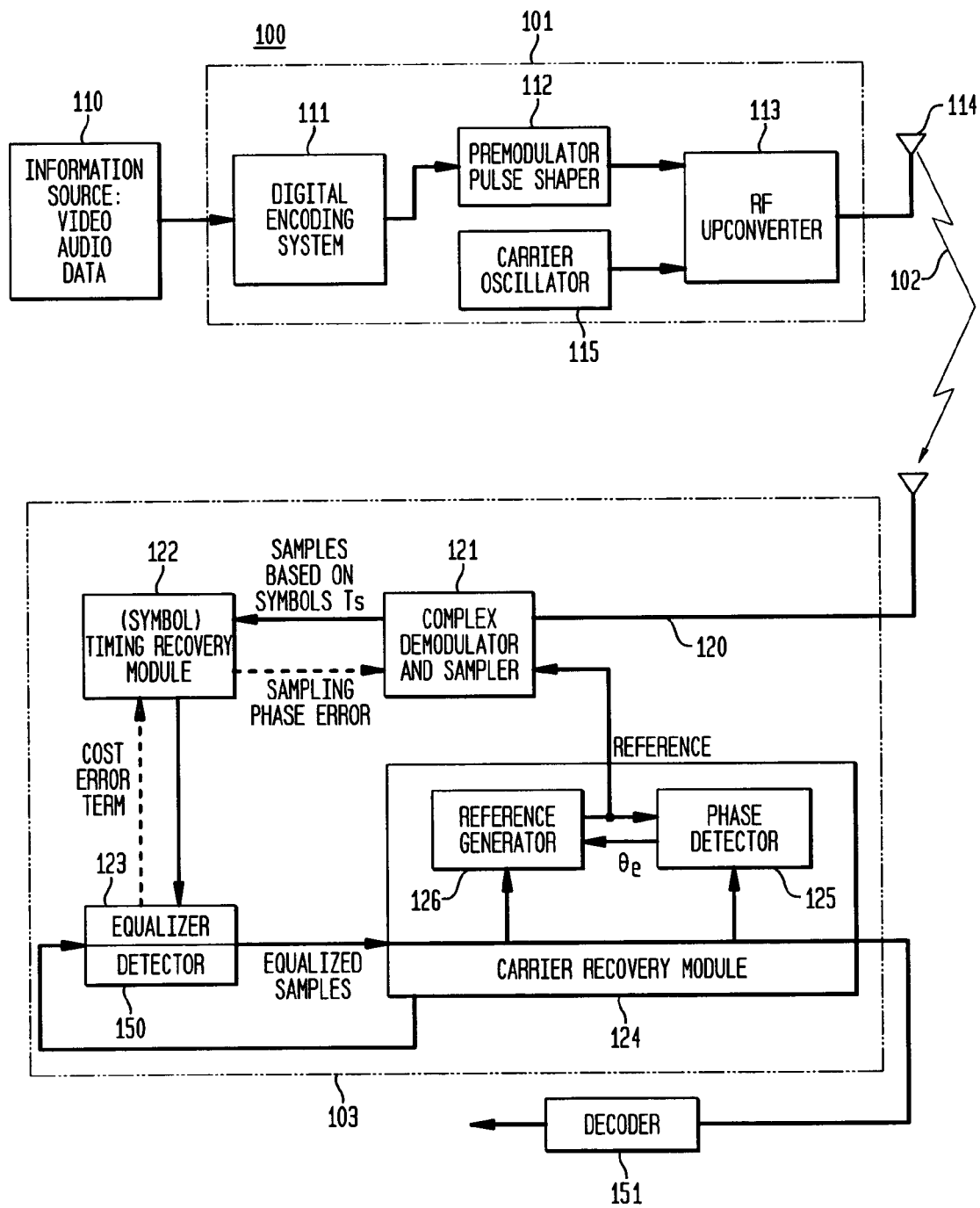
FIG. 1 shows a typical prior art communication system that may be employed for transmission of digital television signals.
Figure 2A:
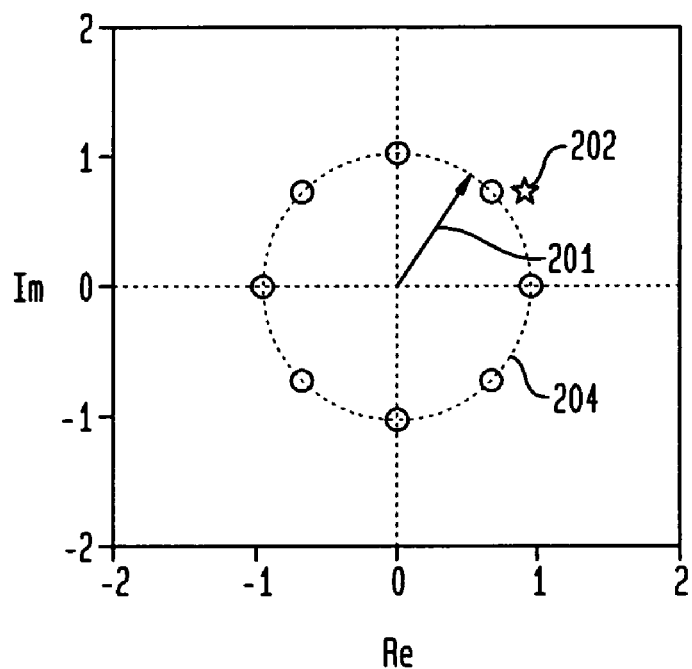
FIG. 2A illustrates a constant modulus criterion based on determining a radius about the origin of an 8-PSK source constellation.
Figure 2B:
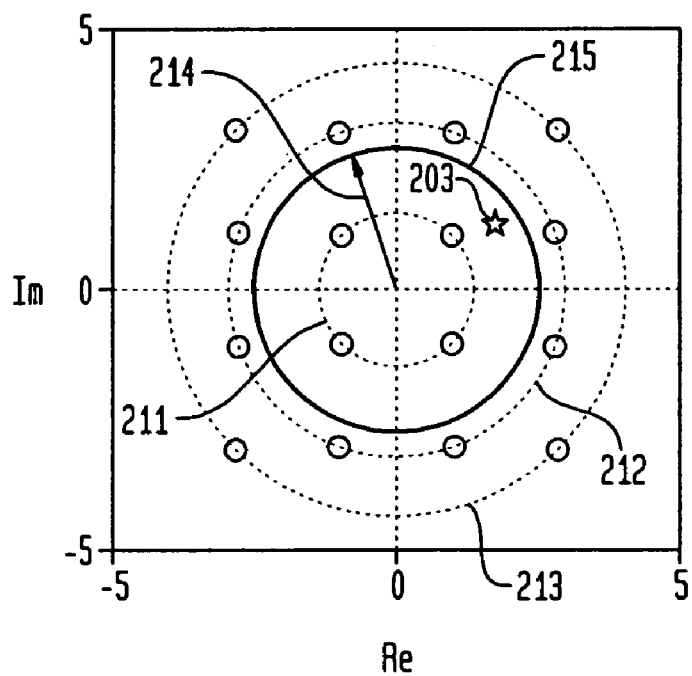
FIG. 2B illustrates a constant modulus criterion based on determining a radius about the origin of a 16-QAM source constellation.
Figure 3:
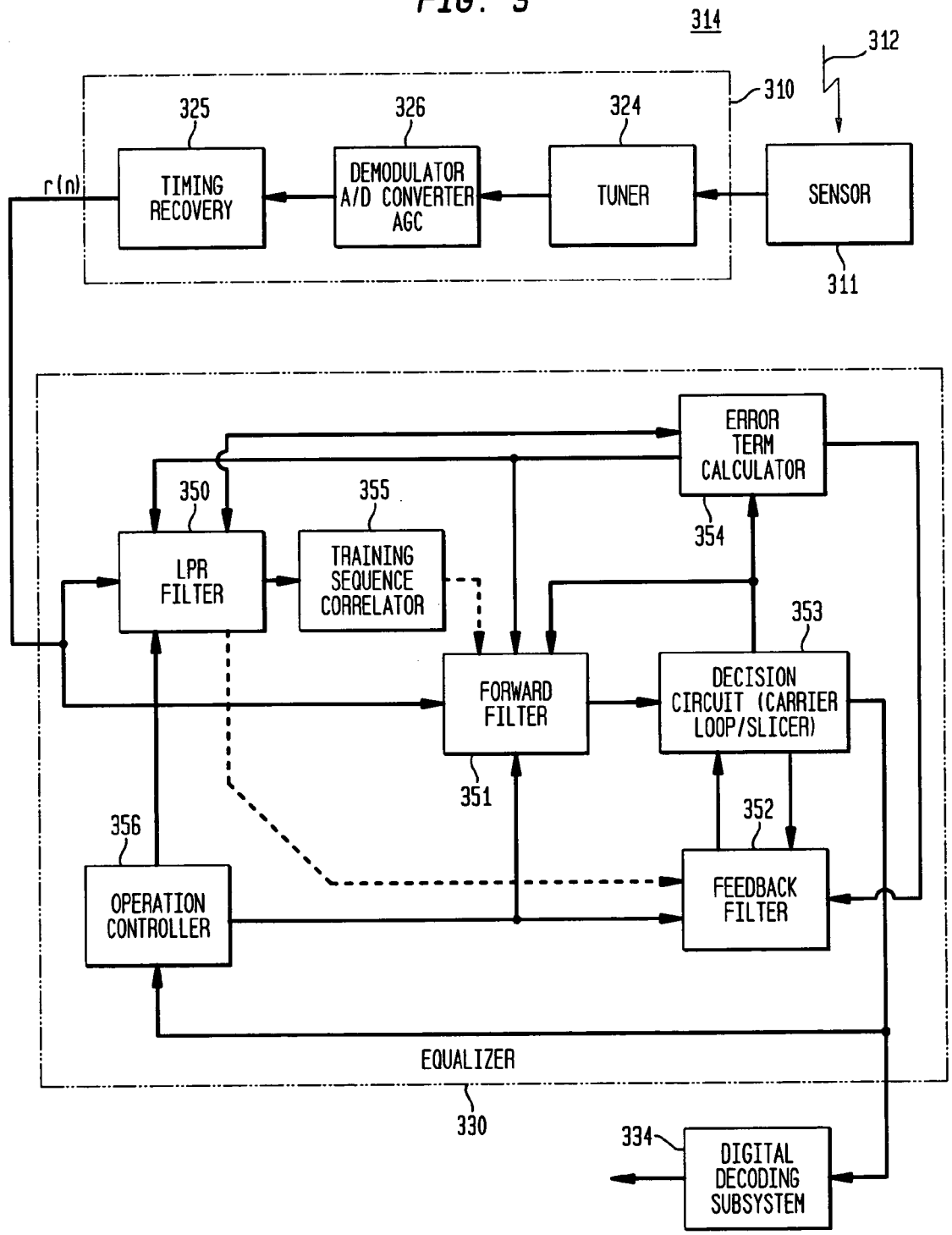
FIG. 3 shows a receiver including an equalizer operating in accordance with exemplary embodiments of the present invention.

FIG. 3 shows receiver 314 coupled to propagation medium 312 by sensor 311. Receiver 314 includes equalizer 330 operating in accordance with an exemplary embodiment of the present invention. Through sensor 311, receiver 314 detects and receives signals passing through medium 312. Receiver 314 receives signals that are generated and passed to medium 312 by a transmitter, such as a broadcast station (not shown), that encodes and modulates an information source s(n) (such as video, audio and/or other data). The encoded signal s(n) is modulated onto the phase and/or amplitude of a suitable carrier frequency for transmission through medium 312.

Receiver 314 may be employed in a digital communication system broadcasting digital television signals in accordance with, for example, the ATSC standard for digital television, "ATSC Digital Television Standard," Doc. A/53B, August 2001. Consequently, the preferred embodiments of the present invention operate on received signals having complex VSB modulation format. VSB is the modulation format adopted for terrestrial broadcast of digital television signals in the United States by the ATSC standard.

Receiver 314 includes front-end circuitry 310 that digitizes and synchronizes the signals received by sensor 311 to various processing of the signals by receiver 314. The front-end circuitry generates a corresponding signal r(n).

Front-end circuitry 310 comprises tuner 324; demodulator, analog-to-digital (A/D) converter, and automatic gain control (AGC) circuit (Demod-A/D-AGC) 326, and timing recovery module 325. Timing recovery module 325 matches the processing rate (or a multiple of the rate) of the digital receiver to the source symbol rate at the transmitter.

In operation, tuner 324 selects an appropriate RF carrier frequency for receiving certain signals from propagation medium 312 through sensor 311. The output signal of tuner 324 is a data-modulated carrier signal at an intermediate (carrier) frequency (IF). The output signal from tuner 324 is sampled by the A/D converter of Demod-A/D-AGC 326 to generate a sequence of digital samples for each received signal. Also, an AGC feedback loop of Demod-A/D-AGC 326 automatically adjusts the overall signal gain level of receiver 314. The sampled signal is further down-converted to near baseband and split into in-phase (I) and quadrature (O) components by a quadrature demodulator of Demod-A/D-AGC 326. The complex-valued signal from circuitry 326 is provided to timing recovery module 325. Timing recovery module 325 interpolates the data to a time/phase-shifted sequence of samples if the A/D converter has a free-running sampling clock. The recovered signal output from timing recovery module 325 is applied to equalizer 330.

Equalizer 330 includes linear predictive (LPR) filter 350, forward filter 351, feedback filter 352, decision circuit 353 (e.g., having a carrier loop and slicer), error term calculator 354, training sequence correlator 355, and an operation controller 356. For purposes of equalization applied to the received signal(s) by equalizer 330, the term "communication channel" includes system elements of the transmitter that generate the carrier modulated data, propagation medium 312, and front-end circuitry 310 of receiver 314. A transfer function (frequency domain) and an impulse response (time domain) may characterize the communication channel. The operation of filters 350, 351, 352, decision circuit 353, error term calculator 354, training sequence correlator 355, and operation controller 356 in receiver 314 compensate for signal distortion and added noise from the communication channel.

Error term calculator 354, responsive to the input and output signals of decision circuit 353 (e.g., responsive to input and output signals of the slicer and carrier tracking loop) and to the output of LPR filter 350 generates error terms. These error terms are used to update (through a recursive function) filter coefficients of LPR filter 350, forward filter 351 and feedback filter 352. Various error terms may be generated in accordance with methods known in the art. Preferred embodiments of the present invention generate an error term based on a single-axis, Constant Modulus (SA-CM) criterion and its stochastic gradient, the SA-CM algorithm (SA-CMA). Least mean square (LMS) and decision-directed (DD) error terms may also be generated. Generation of such error terms is described in U.S. patent application Ser. No. 09/761,303, entitled "Blind Cost Criterion Timing Recovery" to Biracree et al., filed Jan. 17, 2001; and in U.S. patent application Ser. No. 09/922,006, entitled "Carrier Phase Estimation Based On Single-Axis Constant Modulus Cost Criterion and Bussgang Criteria", to Touzni et. al., filed Aug. 3, 2001, which are incorporated herein by reference. Embodiments of the present invention also generate an error term based on a single-axis output power (SA-OP) criterion to set parameters of LPR filter 350 via a stochastic gradient descent algorithm termed the SA-OP algorithm (SA-OPA).

Training sequence correlator 355 allows for presetting of filter parameters (e.g., filter tap coefficients) of forward filter 351 when a training sequence is available in the received signal. Correlating the conjugated output of LPR filter 350 with a (time-reversed) locally available, predetermined training sequence yields an estimate of the ideal forward filter response. The carrier loop of decision circuit 353 provides carrier recovery (e.g., for precise carrier demodulation). Forward filter 351 and feedback filter 352 operate in conjunction with the carrier tracking loop to pull the local oscillator (not shown) of the complex demodulator into precise carrier frequency and phase lock with the transmitter oscillator. The slicer of decision circuit 353 provides nearest-element symbol decisions and data bit estimates for subsequent error correction and decoding in digital decoding subsystem 334.

Operation Modes

Equalizer 330 operates in at least three modes that may be selected by operation controller 356: coarse initialization mode, acquisition mode and tracking mode. The initial mode of operation is coarse initialization, where LPR filter 350 is adapted with SA-OPA. The steady-state parameters of the LPR filter are used to initialize the feedback filter of the equalizer. The output of the training sequence correlator is used to initialize the forward filter when the training sequence is detected (and available). Once the forward and feedback filters are initialized, equalizer 330 transitions to acquisition mode. In acquisition mode, equalizer 330 is configured as a LE and applies equalization to the received signal until distortion is sufficiently removed to guarantee successful convergence of DD adaptation in a DFE configuration. During acquisition mode, filter parameters are continually adapted, and the error term used is preferably a weighted combination of CM and DD error terms. Tracking mode is entered when distortion is sufficiently removed and a low probability of symbol errors (typically less than 10% symbol errors) is achieved. In tracking mode, the equalizer switches from a LE configuration to a DFE configuration, and uses the DD error term for adapting equalizer filter parameters and adjusting the output signal of equalizer 330 to (near) optimum achievable performance. These modes are discussed in more detail below.

Figure 4:
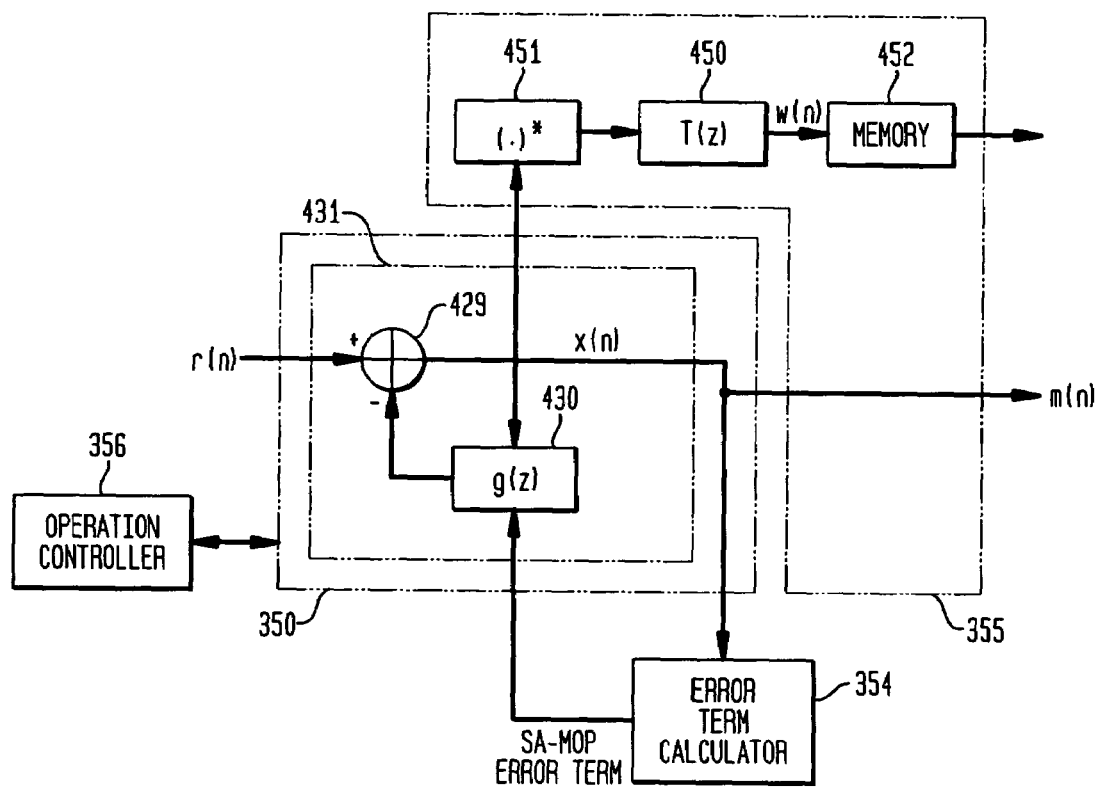
FIG. 4 shows an exemplary implementation of the linear predictive filter and training sequence correlator of FIG. 3.

Operation during coarse initialization occurs as follows: FIG. 4 shows LPR Filter 350 and training sequence correlator 355 operating on complex-valued signal r(n). The signal r(n) is applied to filter 431, which may be implemented as shown in FIG. 4 by applying function g(z) of filter 430 to the output x(n) of filter 431 and subtracting the result from the input signal r(n) in combiner 429. Training sequence correlator 355 is shown as the combination of conjugate operator 451, correlator 450 and memory 452.

During coarse initialization mode, function g(z) of filter 431 is adaptively set via the SA-OPA algorithm, given by the output signal of error term calculator 354 (FIG. 3), for a predetermined period of time or until the adaptively-set filter parameters reach steady-state values. The filter parameters may be considered to have reached steady state if, for several iterations, the values have little or no change. In accordance with embodiments of the present invention, coarse initialization of the filter parameters of forward filter 351 (FIG. 3) is either with predetermined values or with a channel estimate derived from correlation with a training sequence embedded in, or transmitted with, the modulated signal from the transmitter.

When a training sequence is available, conjugate operator 451 (shown with operator (•)*) produces the complex conjugate of output x(n) from filter 431. Correlator 450 operates on the output of conjugate operator 451 by correlating its input signal with a predetermined, locally-available training sequence (e.g., the correlator is a filter whose coefficients consist of the time reversed training sequence symbols). The correlation process continues until a correlation with the transmitted training sequence symbols is detected. The correlation output stored in the memory 452 is then used to coarsely initialize the filter parameters of forward filter 351 (FIG. 3). The training sequence correlation method for initializing the forward filter is in contrast to prior art methods, which adapt the parameters of the forward filter with a CMA-based error term.

Figure 5:
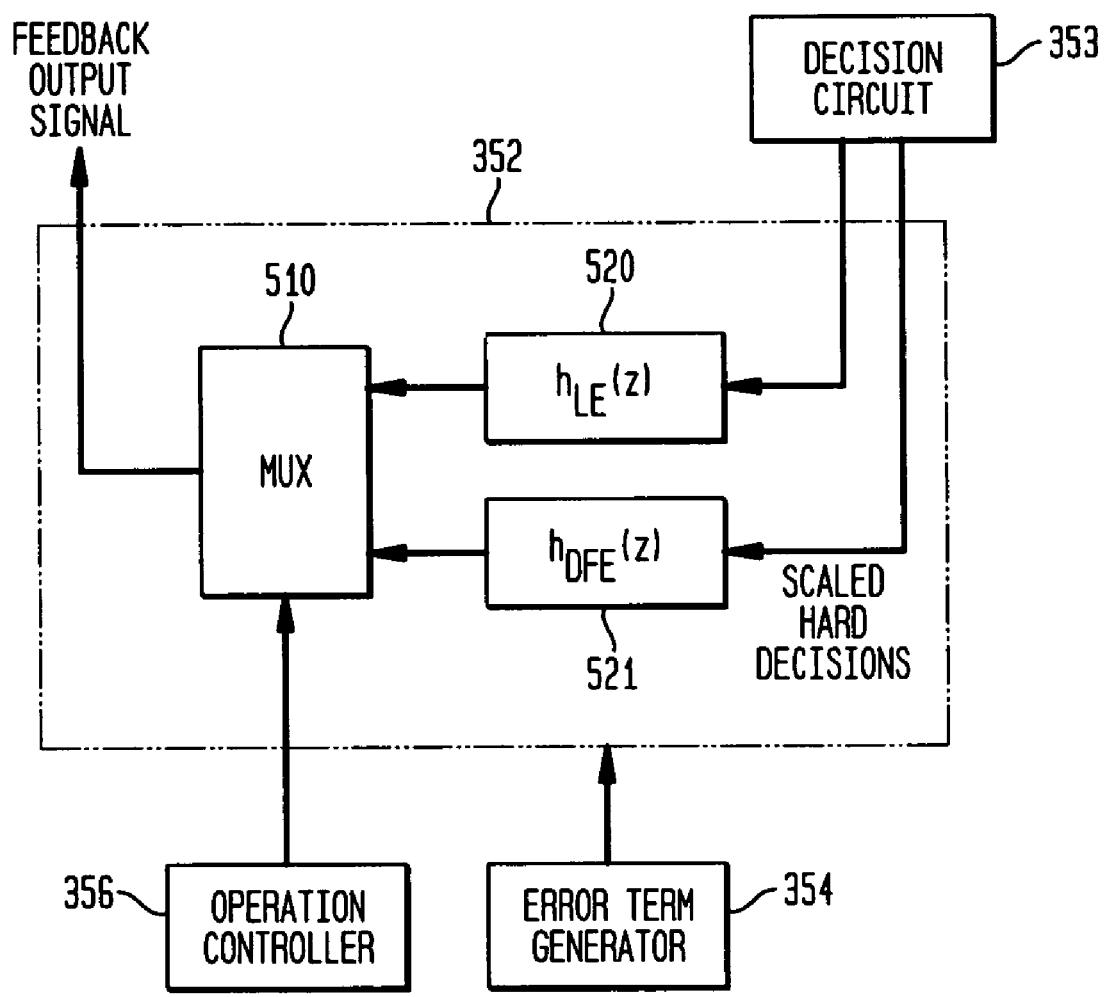
FIG. 5 shows an exemplary implementation of the feedback filter of FIG. 1.

Acquisition mode operates as follows: FIG. 5 shows feedback filter 352 having mux 510, filter 520 that applies feedback function $h_{LE}(z)$ to its input signal, and filter 521 that applies feedback function $h_{DFE}(z)$ to its input signal. Mux 510 selects, based on a signal from operation controller 356, either the output of the LE feedback filter 520 or DFE 521, and couples the output of the LE feedback filter 520 to decision circuit 353. The feedback functions $h_{LE}(z)$ and $h_{DFE}(z)$ have the same coefficients and are, thus, equivalent, but operate on soft and hard decisions, respectively.

In acquisition mode parameters of forward filter 351 (FIG. 3) and feedback filter 352 are adapted jointly using the output value of error term calculator 354, from the initialization given in the coarse initialization stage. When in acquisition mode, receiver 314 (FIG. 3) is configured using linear equalization (LE). Returning to FIG. 5, filter 520 applies feedback function $h_{LE}(z)$ to soft decisions (e.g., soft symbols input to the slicer) generated by decision circuit 353.

Tracking mode operates as follows, and is the preferred mode for steady-state operation where receiver 314 in FIG. 3 is configured using decision feedback equalization (DFE). Returning to FIG. 5, during DFE operation filter 521 applies feedback function $h_{DFE}(Z)$ to hard decisions generated by decision circuit 353 (e.g., scaled hard decisions output from the slicer). Mux 510 selects, based on a signal from operation controller 356, filtered hard decisions from filter 521 as the output signal of feedback filter 352. As in acquisition mode, parameters of forward filter 351 (FIG. 3) and feedback filter 352 are adapted jointly using values generated by error term calculator 354 (FIG. 3).

Figure 6:
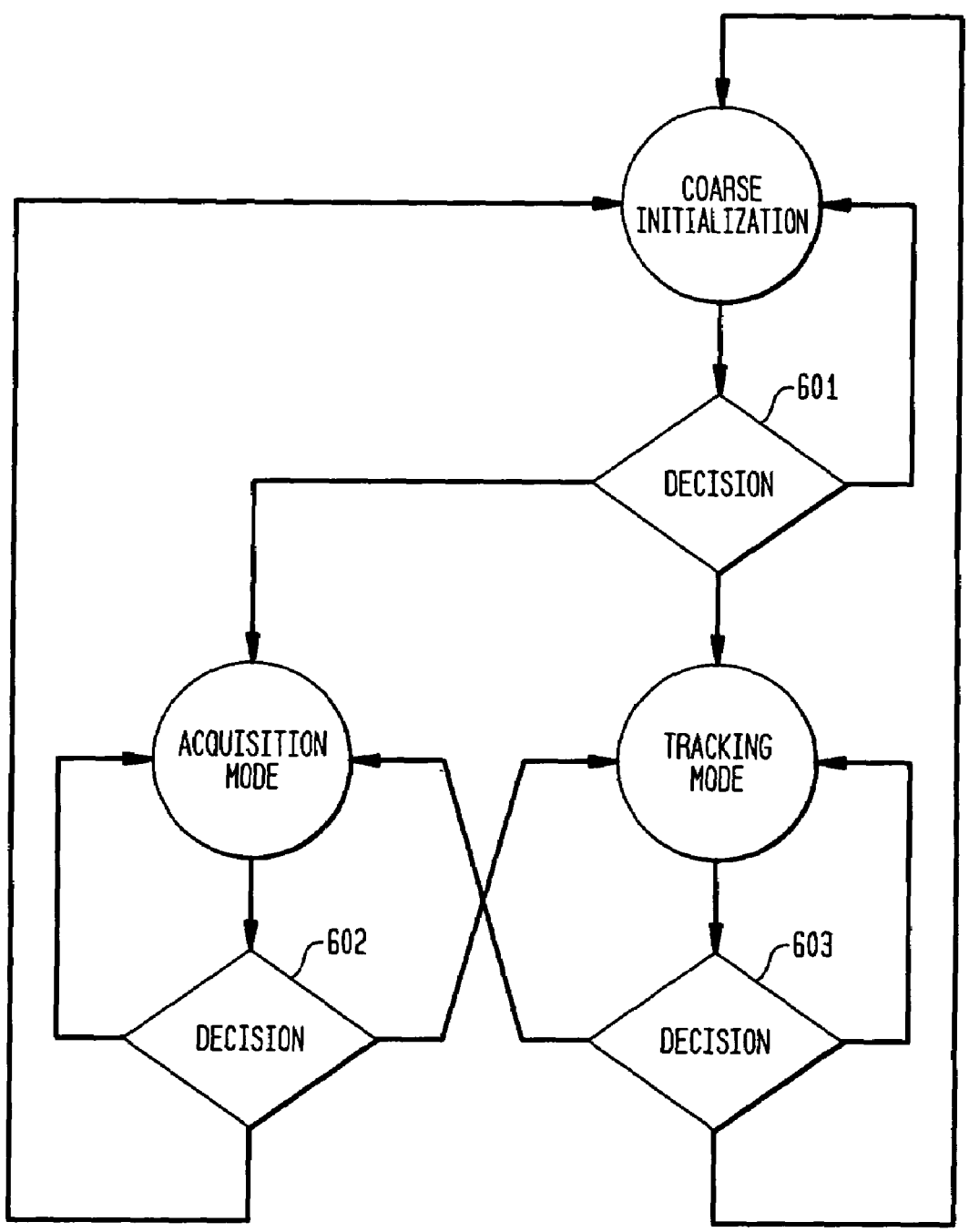
FIG. 6 shows a flow diagram that may be used by operation controller governing the selection of operation modes.

Switching between these three modes may be implemented by waiting for a fixed amount of time and then switching, and/or by switching when parameters of the adaptively set filters pass a test indicating that the parameters have reached steady-state values. Alternatively, operation controller 356 may be used to switch between these three modes either automatically and/or adaptively. For example, FIG. 6 shows a flow diagram governing the selection of operation modes that may be used by operation controller 356. Decisions 601, 602, and 603 may be based on a variety of performance measures known in the art, such as cluster variance (CV), signal to noise ratio, and frame lock status.

Figure 7:
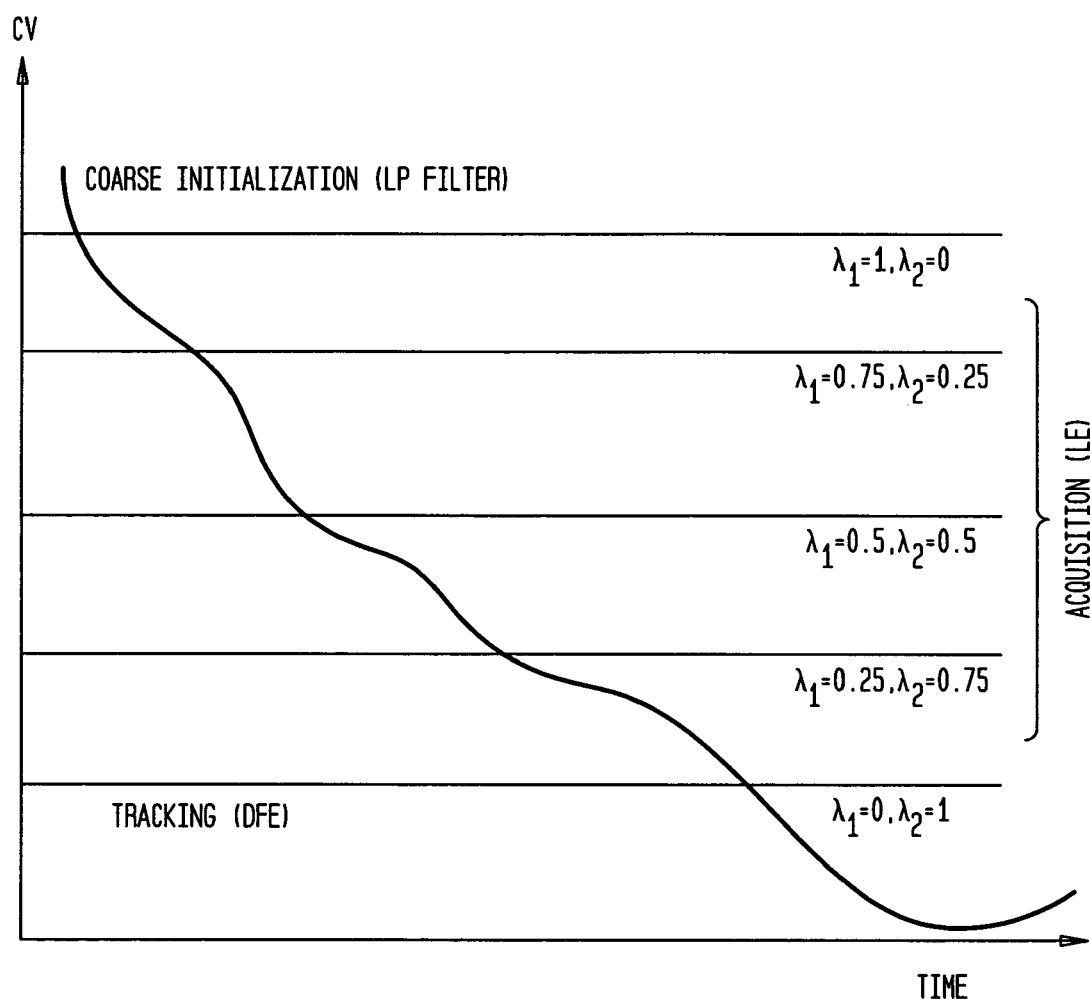
FIG. 7 shows a graph of cluster variance measure versus time for selection of equalizer modes.

FIG. 7 shows a graph of CV measure versus time for a selection of equalizer modes. Equalizer modes are switched with adaptively generated error term values based on a CV measure and output power measure. For FIG. 7, the error term is either a CM error term (e.g., generated via the CMA method), a decision directed (DD) error term (e.g., such as by the DD method), or a linear combination of the CM error term and DD error terms. The weight $\lambda_1$, $0 \leq \lambda_1 \leq 1$, is associated with the weighting of the CM error term in the combination, the weight $\lambda_2$, $0 \leq \lambda_2 \leq 1$, is associated with the weighting of the DD error term in the combination, and $\lambda_1 + \lambda_2 = 1$.

Operation of equalizer 330 starts in coarse initialization mode. When the output signal power of LPR filter 350 reaches a steady-state level (i.e., the power is approximately constant) and/or the training sequence is detected at the output of the training correlation, operation is switched from coarse initialization to acquisition mode. In acquisition mode, the error term is either a CM error term, or a linear combination of the CM error and DD error terms. The decision of which error term or combination of error terms used, and the weighting values $\lambda_1$, $\lambda_2$, may be based on a comparison of the CV measure to a series of threshold values. Finally, when the CV measure drops below a threshold limit, operation switches from acquisition mode to tracking mode. In tracking mode, equalizer 330 has forward filter 351, decision circuit 353, and feedback filter 352 configured as a decision feedback equalizer (DFE), and error term calculator provides DD error term updates.

Passband/Baseband Single-axis Equalization

Single-axis equalization is used for complex-valued signals that originate from a single-dimensional data signal. For example, complex VSB modulation encodes a pulse-amplitude modulation (PAM) signal constellation onto the real-axis and a Hilbert Transform of the PAM data on the imaginary axis of the complex signal. Hence, equalizer 330 employs single-axis equalization that uses real-part extraction of the output of equalizer 330 to estimate the source and compute error terms for adaptation. Two alternative single-axis equalization architectures are now described for equalizer 330.

Figure 8:
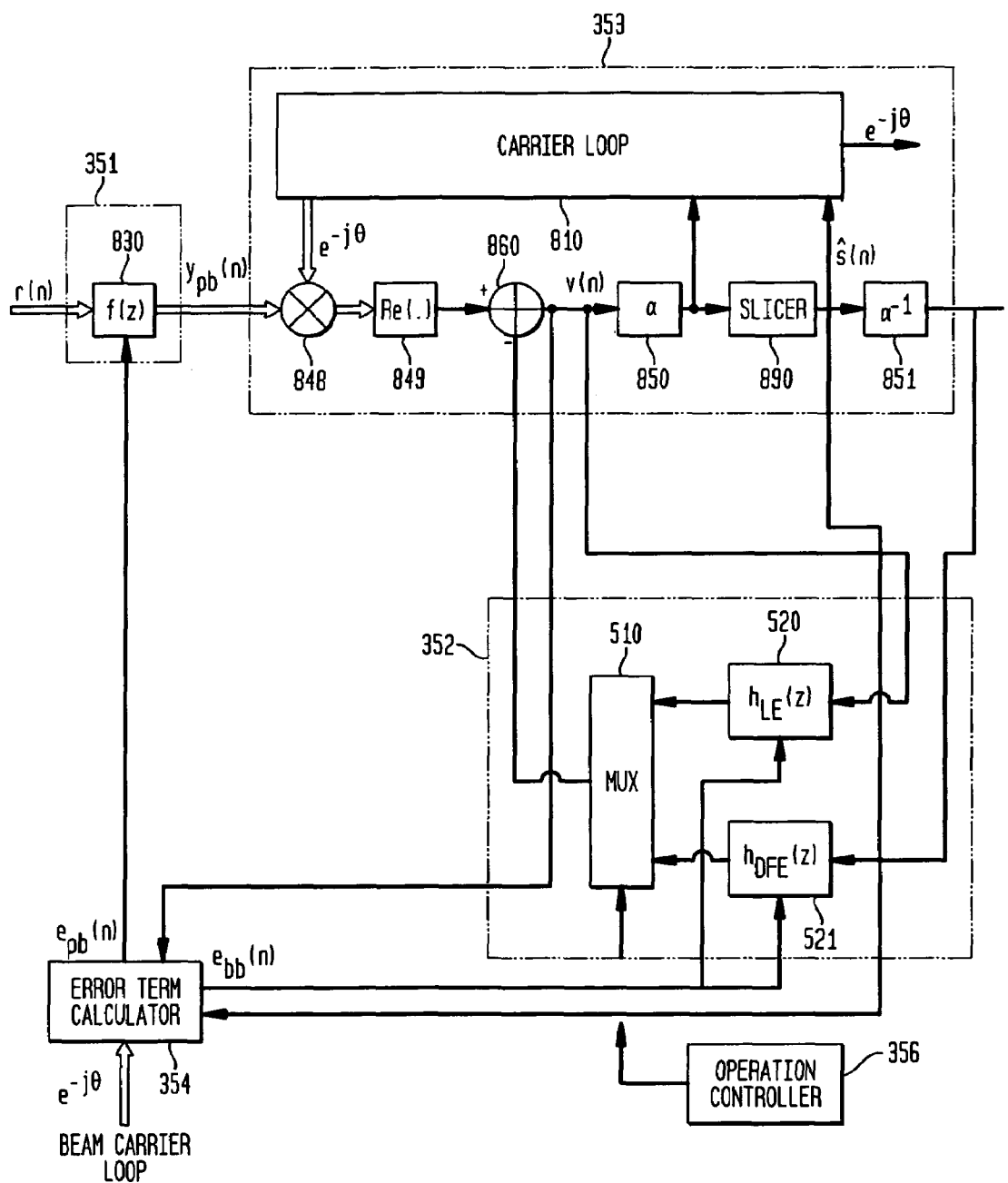
FIG. 8 shows a first exemplary single-axis architecture for the equalizer of FIG. 1.

FIG. 8 shows forward filter 351 and feedback filter 352, and decision circuit 353 for a first exemplary single-axis architecture. For the equalizer architecture of FIG. 8 employed in a single-axis (e.g., complex VSB modulation) receiver, f(z) filter 830 of forward filter 351 operates on signals at passband frequencies (i.e., "in the passband"), while filters 520 and 521 of feedback filter 352 operate on signals at baseband frequencies (i.e., "in the baseband"). The complex-valued signal r(n) provided by, for example, front-end circuitry 310 of FIG. 3, is applied to the f(z) filter 830. For f(z) filter 830, the filter is typically implemented as an FIR filter having transfer function $f(z) = f_0 + f_1 z^{-1} + \ldots + f_{N_f} z^{-N_f}$, where $f_0, f_1, \ldots f_{N_f}$ are the filter parameters (tap coefficients), and ($N_f$+1) is the total number of tap coefficients.

The passband output signal $Y_{pb}(n)$ of f(z) filter 830 is given as in equation (3):

$$y_{pb}(n) = f_0 r(n) + f_1 r(n-1) + \ldots + f_{N_f} r(n-N_f). \quad (3)$$

where "n" indicates the sample at time n. The output of f(z) filter 830 is applied to a mixer 848 (e.g., a multiplier) that multiplies signal $Y_{pb}(n)$ with $e^{-j\theta}$ provided by carrier loop 810 (the angle θ is typically a time varying parameter θ(n) but dependence in time "n" is omitted for simplicity). Mixer 848 operates to de-rotate (translate) the phase of processed signal $y_{pb}(n)$ to precise baseband frequency (DC) by multiplication with $e^{-j\theta}$. Real-part extraction module 849 performs real-part extraction of the complex-valued output signal, yielding a real-valued signal $y(n) = \text{Re}\{y_{pb}(n)e^{-j\theta}\}$ for input to combiner 860. Real-part extraction module 849 may, when implemented, be included in mixer 848.

The output signal of feedback filter 352 in combiner 860 is subtracted from signal samples y(n) at the output of real-part extraction module 849 (or of mixer 848). The output value v(n) of combiner 860 is referred to as a "soft decision" for the data since the samples of input data have been equalized, but not yet compared to symbol values to generate a decision ("hard decision") for the input data. When operating as a linear equalizer (LE), the soft decision v(n) is applied to LE filter 520 of feedback filter 352, and mux 510 selects the output of LE filter 520 for input to combiner 860.

The output value v(n) of combiner 860 is gain adjusted in multiplier 850 by a gain α>0 prior to application to slicer 890. The gain adjustment by α compensates for attenuation due to processing errors, such as residual errors in channel and/or carrier estimation. Selection of the gain parameter α is discussed subsequently.

The gain-adjusted value αv(n) is applied to slicer 890, which generates a hard decision by comparing the gain adjusted soft decision αv(n) with a set of decision levels. The decision levels of slicer 890 are typically set as nominal decision threshold levels corresponding to each symbol in the expected constellation. The output value ŝ(n) represents a value corresponding to one of the hard decision levels of the signal αv(n), which also correspond to the expected signal levels of the source signal. When operating as a decision feedback equalizer (DFE), hard decisions are input to DFE filter 521 and selected by Mux 510. However, the output signal ŝ(n) may be re-adjusted by inverse gain $\alpha^{-1}$ in multiplier 851.

Carrier loop 810 may comprise a phase detector, an internal loop filter and an internal sine/cosine generator, not shown in FIG. 8, for carrier tracking. In combination with the signal de-rotation performed by multiplier 848, carrier loop 810 implements a closed-loop feedback system for recovering the frequency and phase of the carrier signal. The phase difference between input and output signals of slicer 890 is detected by carrier loop 810. The detected phase difference is filtered in the internal loop filter, which controls the frequency and phase of the internal sine/cosine generator. The detected phase error changes the generated sine wave in a direction so as to reduce the detected phase difference between the input signals to the internal phase detector. At steady-state frequency lock, carrier loop 810 provides signal $e^{-j\theta}$ to the de-rotator to track the input carrier frequency and phase. Many methods of carrier recovery exist in the art. For example, U.S. patent application Ser. No. 09/922,006, to A. Touzni et. al., entitled Carrier Phase Estimation Based on Single-Axis Constant Modulus Cost Criterion and Bussgang Criteria, filed Aug. 3, 2001, and incorporated herein by reference discusses methods of operating a carrier loop based on the CM criterion for a single-axis receiver.

Error term calculator 354 may employ either or both soft decision v(n) and hard decision ŝ(n), together with the output signal $e^{-j\theta}$ of carrier loop 810 to calculate updated (passband) error terms for the forward filter 351, and updated (baseband) error terms for the feedback filter 352. For example, a linear combination $J_{combo}(f,h)$ of the CM and DD cost criteria may be defined as in equation (4):

$$J_{combo}(f,h)=\lambda_1 E\{(\rho^2-V^2(n))^2\}+\lambda_2 E\{(v(n)-\hat{s}(n))^2\} \quad (4)$$

where $\rho^2$ is a scalar that depends on the source statistics. The stochastic gradient descent coefficient update algorithm for minimization of the given criterion in equation (4) may be as given in equation (5):

$$f_j(n+1)=f_j(n)-\mu r^*(n-j)e_{pb}(n) \quad h_j(n+1)=h_j(n)+\mu\phi(n-j)e_{bb}(n) \quad (5)$$

where μ, 0<μ<1, is the step size, φ(●) is feedback update regressor data, the baseband error term $e_{bb}(n)$ is given as in equation (6):

$$e_{bb}(n)=\lambda_1 v(n)(\rho^2-v^2(n))+\lambda_2(v(n)-\hat{s}(n)), \quad (6)$$

and $e_{pb}(n)=e^{-j\theta}e_{bb}(n)$ is the passband error term. The recursive update as shown in equation (5) is employed during modes when the equalizer is configured as either a DFE or a LE. The update regressor values φ(●) may be different depending on whether the equalizer is configured as a DFE or a LE. Expressions for the update regressor data values are shown in Table 1. Note that at any time n the transfer function for the LE filter $h_{LE}(z)$ and DFE feedback filter $h_{DFE}(z)$ is given by equation (7):

$$h^{(n)}(z)=h_0(n)+h_1(n)z^{-1}+\ldots+h_{N_h}(n)z^{-N_h}. \quad (7)$$

TABLE 1

| Configuration | Feedback Regressor |
|---|---|
| DFE | $\phi(n) = a^{-1}\hat{s}(n)$ |
| LE | $\phi(n) = v(n)$ |

Baseband/Baseband Single-axis Equalization

Figure 9:
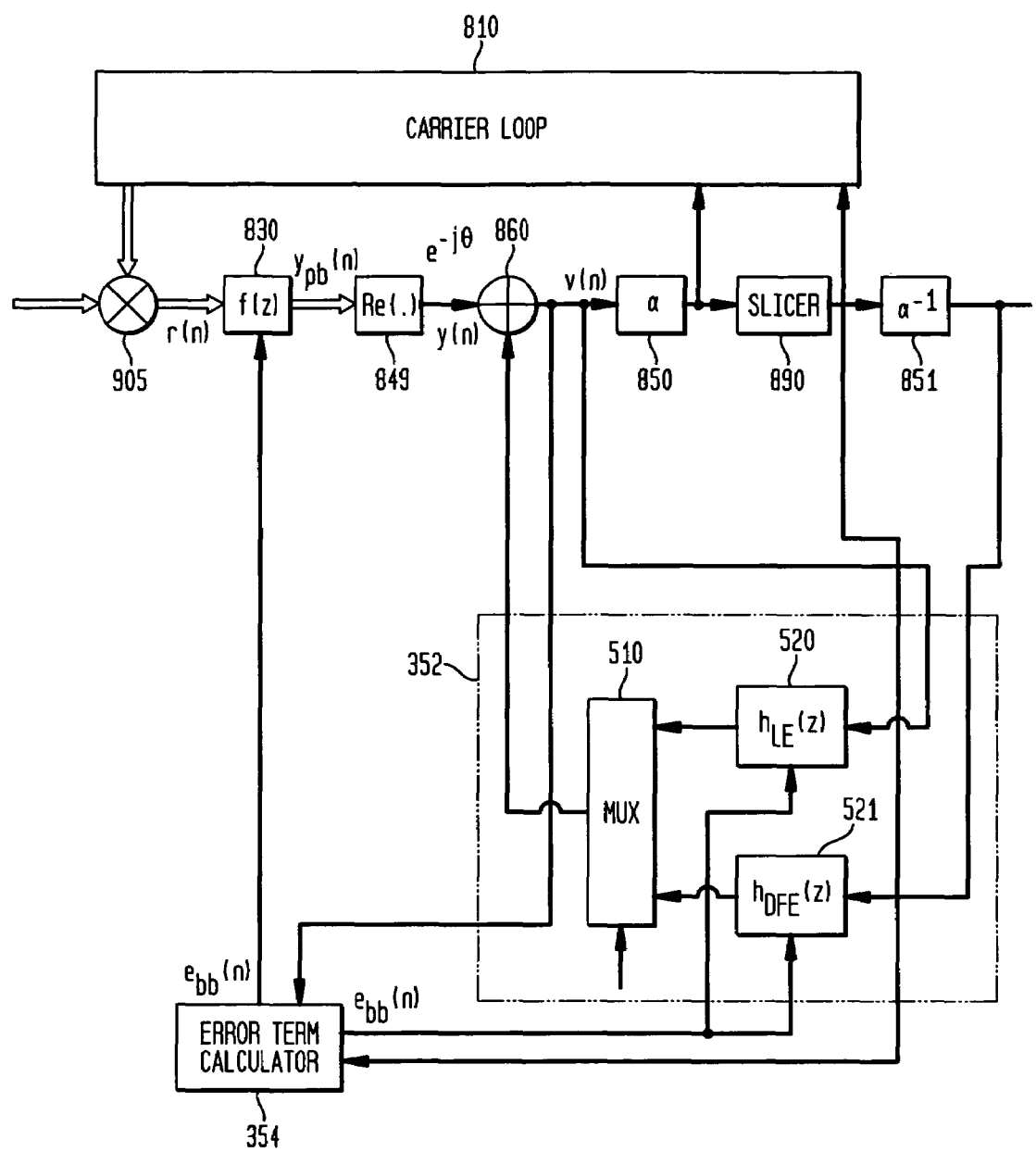
FIG. 9 shows a second exemplary single-axis architecture for the equalizer of FIG. 1.

FIG. 9 shows a second exemplary single-axis architecture in which both forward filter 830 and feedback filter 352 operate in the baseband. The second exemplary single-axis architecture is similar to that of the first exemplary single-axis architecture shown in FIG. 8. However, in the second single-axis exemplary architecture, de-rotation of the signal occurs in multiplier 905 before signal r(n) is applied to forward filter 830, and real part extraction module 910 provides the real part of the complex signal from forward filter, yielding a real-valued signal y(n)=Re {$y_{pb}(n)$} input to combiner 860. Both forward filter 830 and feedback filter 352 are updated with baseband error term $e_{bb}(n)$ in accordance with Table 1 and equation (5).

Coarse Initialization of Single-axis Equalizers

In contrast to methods of the prior art, an LPR filter operating in accordance with an exemplary embodiment of the present invention uses real-valued parameters, and is adapted using real-valued error terms. The real-valued parameters of the linear predictive filter are then copied to the feedback filter to initialize the feedback filter. Feedback filter 352 requires real-valued filter parameters for $h^{(n)}(z)$ due to the nature of single-axis modulations and equalization. In accordance with the present invention, the parameter adaptation process for LPR filter 350 includes real-part extraction for the error term. The real-valued constraint on the filter parameters and on the stochastic gradient algorithm achieves the preferred LPR filter function for complex-valued processing of single-axis signals, and in particular, VSB modulated signals.

Linear prediction for coarse initialization mode in a single-axis architecture, such as shown in FIGS. 8 and 9, is now described. Returning to FIG. 4, during coarse initialization, the IIR version of LPR filter 350 receives a single, complex-valued received signal r(n), and this signal is processed by LPR filter 350 to yield output signal x(n) given in equation (8):

$$x(n)=-g_1 x(n-1)-\ldots-g_{N_g}x(n-N_g)+r(n) \quad (8)$$

where the filter parameters $g_j$, $1 \leq j \leq N_g$, are real-valued coefficients ($N_g$ is an integer number of filter coefficients).

The desired LPR filter parameters are given by the minimization of the SA-OP criterion as in equation (9):

$$g_{OP} = \arg\min_{g(z),g, \, \epsilon R} J_{OP}, \quad J_{OP} = E[|x(n)|^2]. \tag{9}$$

where x(n) is the output of LPR filter 350.

The minimization in equation (9) is accomplished via adaptation of each parameter (coefficient) $g_j$ of LPR filter 350 through the stochastic gradient descent (SA-OPA) update given in equation (10):

$$g_j(n+1) = g_j(n) + \mu Re\{x^*(n-j)x(n)\}, \text{ for } j=1, \ldots, N_g \tag{10}$$

The output x(n) of the LPR filter 350 is the error term used in the update rule of equation (10). We refer to x(n) as the SA-OP error term. Hence, error term calculator 354 (FIG. 3.) simply feeds back the output of the LPR filter 350 for adaptation of its parameters.

The transfer function g(z) of filter 430 at time n is defined as in equation (11):

$$g^{(n)}(z) = g_1(n)z^{-1} + \ldots + g_{N_g}(n)z^{-N_g} \tag{11}$$

When the adaptively set coefficients of LPR filter 350 reach steady-state values, these parameters $g^{(n)}(z)$ are copied into feedback filter 352 as filter function $h^{(n)}(z)$ (into both filters 520 or 521) in FIG. 3 and acquisition mode is entered. In accordance with embodiments of the present invention, filters are constrained to have real-valued feedback filter parameters (as in equation (9)) and real-part extraction in the SA-OPA algorithm (as in equation (10)) for single-axis equalization of complex-valued received data from single-axis modulated sources, such as VSB modulated sources.

In addition, and in contrast to prior art methods employing a CM cost function to initialize the forward filter, embodiments of the present invention employ either of two methods to initialize the parameters of the forward filter. Either 1) fixed values (for example, a "center spike"); or, 2) when a training sequence is available, an estimate of the (mathematically optimal) minimum mean square error (MMSE) based on correlation of the conjugated output of the LPR filter with the training sequence are employed to initialize the forward filter. When a training sequence with symbols $s_0$, $s_1, \ldots, S_P$ is available to equalizer 330, the transfer function T(z) of correlator 450 (FIG. 4) of training sequence correlator 355 is set to the time reversed training sequence in equation (12):

$$T(Z) = s_p + s_{p-1}z^{-1} + \ldots + s_0 z^{-(P-1)} \tag{12}$$

and the output w(n) of equation (13):

$$w(n) = x^*(n)s_p + x^*(n-1)s_{p-1} + \ldots + x^*(n-P)s_0 \tag{13}$$

of each correlation is stored in register 451. When a correlation peak is found, a window surrounding the correlation peak is used to initialize the forward filter parameters as in equation (14):

$$f(z) = \beta[w(n-K) + w(n-1-K)z^{-1} + \ldots + w(n-N_f-K)z^{-N_f}] \tag{14}$$

where the constant $K \geq 0$ is selected to center the window, and where the gain constant $\beta$ is selected to scale the parameters of forward filter 351 (FIG. 3) such that the equalized signal applied to the slicer of decision circuit 353 is in the correct range.

Unbiased Slicing

If equalizer 330 (FIG. 3) is a minimum mean-square error (MMSE) equalizer (e.g. MMSE-LE or MMSE-DFE), equalizer 330 generates soft symbol estimates $v(n) = \gamma s(n) + \epsilon(n)$, where $\gamma$ is a constant scaling the desired symbol s(n) and $\epsilon(n)$ represents random, additive signal distortion. The MMSE value generated is given by: $MMSE = (1-\gamma)\sigma_s^2$, where $\sigma_s^2 = E\{|s(n)|^2\}$ is the transmitted source signal power. Thus, when the MMSE value is not zero, $\gamma < 1$, and v(n) is a biased estimator of the symbols s(n). A biased estimator input to slicer 890 (FIG. 8) may not provide optimum performance, especially when $\gamma$ is small. Thus, the input signal v(n) applied to slicer 890 is multiplied by a suitable gain $\alpha = \gamma^{-1}$ before forming a decision by the slicer of decision circuit 353 (FIG. 3). The inventors have determined two estimators for $\gamma$ that may be employed as given in equation (15):

$$\gamma = \sqrt{\frac{E\{|v(n)|^2\}}{\sigma_s^2}} \text{ or } \gamma = \left| \frac{E\{v(n)\hat{s}(n)\}}{\sigma_s^2} \right|. \tag{15}$$

Regularized DFE

To provide robust adaptation that is less susceptible to error propagation, the configuration of LPR filter 350 of FIG. 4 may be used to regularize adaptation of equalizer 330 when configured as a DFE. LPR filter 350 operates in parallel using signal r(n) according to the description in the previous sections. For adaptation of the DFE configuration, however, the minimization criterion is slightly modified to be a regularized criterion in equation (16):

$$J_{reg}(h) = J_{combo}(h) + \lambda \sum_{j=1}^{N_g} (g_j(n) - h_j(n))^2. \tag{16}$$

Update for the DFE configuration feedback filter 352 operating in the baseband is then given by the LPR-regularized DFE update rule in equation (17):

$$h_j(n+1) = h_j(n) + \mu(\alpha^{-1}\hat{s}(n-j)e_{bb}(n) + \lambda(g_j(n) - h_j(n))). \tag{17}$$

For preferred implementations, the scalar $\lambda \geq 0$ is chosen as a relatively small number, or may be adapted, (i.e., $\lambda = \lambda(n)$).

One skilled in the art would understand that the equations described herein, such as equations (3) through (13), may include scaling, change of sign, or similar constant linear modifications that are not shown for simplicity. One skilled in the art would realize that such modifications are readily determined or derived for the particular implementation. Thus, each of the described equations may be subject to such modifications, and are not limited to the exact forms presented herein.

Although the present invention is described herein with respect to certain cost functions, the present invention is not so limited and may be extended in general to any type of cost functions. For example, one skilled in the art may extend the teachings herein to include criteria of Bussgang-class cost functions that may be related to the CM and SA-CM cost function described herein. The Bussgang-class of functions are well-known in the art and are described in, for example, Simon Haykin, Blind Deconvolution, Chapter 2, PTR Prentice-Hall, Englewood Cliffs, N.J. (1994), whose teachings are incorporated herein by reference.

The present invention has been described with respect to a digital television receiver, and in particular, to digital television signals transmitted as a vestigial sideband modulation (VSB). However, one skilled in the art would realize that the techniques described herein may be applied to any receiver processing QAM, PSK, or VSB signals.

As would be apparent to one skilled in the art, the various functions of initialization may be implemented with circuit elements or may also be implemented in the digital domain as processing steps in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. Apparatus for applying equalization to a complex-valued received signal, the received signal being single-axis (SA) modulated data, the apparatus comprising:
    a linear predictive (LPR) filter characterized by a set of real-valued LPR parameters applied to the received signal, wherein the set of LPR parameters are recursively updated based on one or more error terms to minimize output power of the LPR-filtered signal;
    an equalizer configurable as either a linear equalizer (LE) or a decision feedback equalizer (DFE) and applying an estimate of the inverse channel characteristics to the received signal to generate an equalized signal, wherein:
        i) the equalizer comprises a forward (FW) filter characterized by a set of FW parameters, a feedback (FB) filter characterized by a set of real-valued FB parameters, and a decision circuit generating hard decisions for the data of the equalized signal, and
        ii) the set of real-valued FB parameters are initialized by the set of real-valued LPR parameters, the set of FW parameters are initialized with either values of a predetermined impulse response or values based on a function of a channel response, and the set of FW parameters and the set of FB parameters are recursively updated based on one or more error terms; and
    an error term calculator configured to generate the one or more error terms from one or more blind cost criteria based on real-part extraction.

2. The invention as recited in claim 1, wherein, for the equalizer:
    the FW filter applies a FW function to the received signal to generate the FW-filtered signal;
    the FB filter applies a FB function to either soft decisions defined by the equalized signal or the hard decisions to generate a filtered decision; and
    a combiner combines the filtered decision with a real-part of the FW-filtered signal to generate a new soft decision as the equalized signal.

3. The invention as recited in claim 2, wherein the decision circuit comprises:
    a slicer configured to generate a symbol from the equalized signal as a hard decision; and
    a carrier loop configured to detect and adjust a phase error of the received signal.

4. The invention as recited in claim 3, wherein the carrier loop applies the phase error to de-rotate the signal from the FW filter prior to real-part extraction.

5. The invention as recited in claim 3, wherein the carrier loop applies the phase error to de-rotate the signal applied to the equalizer.

6. The invention as recited in claim 3, wherein the equalized signal is adjusted, in gain, to generate an unbiased input signal to the slicer.

7. The invention as recited in claim 3, wherein the equalized signal is scaled with a first scalar prior to its input to the slicer and each hard decision is scaled with a second scalar prior to its input to the FB filter.

8. The invention as recited in claim 7, wherein the first scalar is the reciprocal of the second scalar.

9. The invention as recited in claim 2, wherein the error term calculator receives at least one of the equalized signal and the corresponding hard decision to generate the one or more error terms.

10. The invention as recited in claim 9, wherein the error term calculator also receives the LPR filtered signal.

11. The invention as recited in claim 10, wherein the error term calculator generates a single-axis output power (SA-OP) error term.

12. The invention as recited in claim 9, wherein the error term calculator generates at least one of a decision directed (DD) error term, a constant modulus (CM) error term, and a single-axis CM (SA-CM) error term.

13. The invention as recited in claim 1, wherein, when operating, the equalizer is configured in one of at least three modes:
    a first mode, wherein the set of LPR parameters for the LPR filter are recursively updated based on a single-axis output power (SA-OP) error term until the set of LPR parameters reach steady-state values;
    a second mode, wherein the FW filter, decision circuit, and feedback filter are configured as the linear equalizer, and the set of FW parameters and the set of FB parameters are adapted based on one or more error terms based on real-part extraction; and
    a third mode, wherein the FW filter, decision circuit, and feedback filter are configured as the DFE, and the set of FW parameters and FB parameters are adapted based on a DD error term.

14. The invention as recited in claim 13, further comprising an operation controller, wherein the operation controller either selects the first mode, the second mode, or the third mode based on a performance measure.

15. The invention as recited in claim 14, wherein the performance measure is at least one of a signal-to-noise ratio, a cluster variance, a frame lock-status, a bit error rate, or an output power measure for the received signal.

16. The invention as recited in claim 13, wherein, in either of the second mode or the third mode, the set of FW parameters and the set of FB parameters are adapted based on a combination of an SA-CM error term and a decision-directed (DD) error term.

17. The invention as recited in claim 1, wherein the FB filter comprises a multiplexer (mux), a first feedback filter section, and a second feedback filter section, wherein:
the first FB filter section applies the set of FB parameters to soft decisions corresponding to the equalized signal;
the second FB filter section applies the set of FB parameters to scaled hard decisions generated by the decision circuit for the equalized signal, and
the mux selects as the output of the feedback filter either 1) an output of the first FB filter section when the equalizer is configured as the LE or 2) an output of the second FB filter section when the equalizer is configured as the DFE.

18. The invention as recited in claim 1, wherein data of the received signal includes a training sequence, and wherein the apparatus further comprises:
a training sequence correlator configured to correlate a conjugated signal from the LPR filter with a local sequence i) to detect the training sequence and ii) to generate an estimate of the set of FW parameters,
wherein the set of FW parameters is initialized based on the correlation.

19. The invention as recited in claim 1, wherein the received signal r(n) is complex-valued, wherein the FW filter is adapted to operate in a passband and the FB filter is adapted to operate at baseband, and wherein the recursive update at time n+1 of at least one of the sets of FW parameters ($f_j(n)$) and FB parameters ($h_j(n)$) employs a stochastic gradient descent rule as follows:

$$f_j(n+1)=f_j(n)-\mu r^*(n-j)e_{pb}(n)$$

$$h_j(n+1)=h_j(n)+\mu\phi(n-j)e_{bb}(n)$$

where $\mu$, $0<\mu<1$, is a step size, j is a parameter index, $r(\bullet)$ is the received signal, $\phi(\bullet)$ is feedback regressor data, $e_{bb}(n)$ is a baseband error term, and $e_{pb}(n)$ is a passband error term.

20. The invention as recited in claim 1, wherein the FW filter is adapted to operate at baseband and the FB filter is adapted to operate at baseband, and the recursive update at time n+1 of at least one of the sets of FW parameters (fj(n)) and FB parameters (hj(n)) employs a stochastic gradient descent rule as follows:

$$f_j(n+1)=f_j(n)-\mu r^*(n-j)e_{bb}(n)$$

$$h_j(n+1)=h_j(n)+\mu\phi(n-j)e_{bb}(n)$$

where $\mu$, $0<\mu<1$, is a step size, j is a parameter index, $r(\bullet)$ is the received signal, $\phi(\bullet)$ is feedback regressor data, and $e_{bb}(n)$ is a baseband error term.

21. The invention as recited in claim 1, wherein the received signal is carrier modulated by data in accordance with a complex vestigial sideband (VSB) format.

22. The invention as recited in claim 1, wherein the received signal is a digital television signal having its data encoded in accordance with an ATSC standard.

23. The invention as recited in claim 1, wherein the LPR filter operates in parallel with the equalizer, wherein the forward filter, feedback filters, and decision circuit are configured as the decision feedback equalizer (DFE), the set of LPR parameters is adapted using an SA-OPA update rule, and the set of LPR parameters $g_j(n)$ regularize the set of FB parameters $h_j(n)$ by minimization of the criterion $J_{reg}(h)$ as:

$$J_{reg}(h) = J_{combo}(h) + \lambda \sum_{j=1}^{N_g} |g_j(n) - h_j(n)|^2$$

where $J_{combo}(h)$ is a linear combination of CM and DD cost criteria and the recursive update of the FB parameters employs an LPR-regularized DFE update rule.

24. A method of applying equalization to a complex-valued received signal, the received signal being single-axis (SA) modulated data, the method comprising the steps of:
(a) applying a linear predictive (LPR) filter characterized by a set of real-valued LPR parameters to the received signal;
(b) recursively updating the set of LPR parameters based on one or more error terms to minimize output power of the LPR-filtered signal;
(c) applying either linear equalization (LE) or decision feedback equalization (DFE) to the received signal to generate an equalized signal, wherein step (c) filters with a forward (FW) filter characterized by a set of FW parameters and a feedback (FB) filter characterized by a set of real-valued FB parameters;
(d) generating hard decisions for the data of the equalized signal;
(e) initializing (e1) the set of real-valued FB parameters by the set of real-valued LPR parameters and (e2) the set of FW parameters with either values of a predetermined impulse response or values based on a function of a channel response;
(f) recursively updating the set of FW parameters and the set of FB parameters based on one or more error terms; and
(g) generating the one or more error terms from one or more blind cost criteria based on real-part extraction.

25. The invention as recited in claim 24, wherein step (d) generates each hard decision by the steps of:
(d1) combining i) the real part of the output of the FW filter and ii) the output of the FB filter to form the equalized signal;
(d2) generating a symbol from the equalized signal as a hard decision; and
(d3) adjusting, by a carrier loop, a phase error of the received signal.

26. The invention as recited in claim 25, wherein step (d3) applies the phase error to de-rotate the signal from the FW filter prior to real-part extraction.

27. The invention as recited in claim 25, wherein step (d3) applies the phase error to de-rotate the signal applied to the equalizer.

28. The invention as recited in claim 25, further comprising the step of adjusting, in gain, the equalized signal to generate an unbiased input signal to the slicer.

29. The invention as recited in claim 25, comprising the steps of scaling with a first scalar the equalized signal prior to its input to step (d2) and scaling with a second scalar each hard decision prior to its input to the FB filter.

30. The invention as recited in claim 29, wherein the first scalar is the reciprocal of the second scalar.

31. The invention as recited in claim 24, wherein, for step (c), equalization occurs in one of at least three modes:
a first mode, wherein the set of LPR parameters for the LPR filter are recursively updated based on a single-axis output power (SA-OP) error term until the set of LPR parameters reach steady-state values;

a second mode, wherein the FW filter, a decision circuit, and the feedback filter are configured for LE, and the set of FW parameters and the set of FB parameters are adapted with one or more error terms based on real-part extraction; and a third mode, wherein the FW filter, decision circuit, and feedback filter are configured for DFE, and the set of FW parameters and the set of FB parameters are adapted based on a DD error term.

32. The invention as recited in claim 31, wherein, in either of the second mode or the third mode, the set of FW parameters and the set of FB parameters are adapted based on a combination of an SA-CM error term and a decision-directed (DD) error term.

33. The invention as recited in claim 24, for step (f), recursive update at time n+1 of at least one of the sets of FW parameters ($f_j(n)$) and FB parameters ($h_j(n)$) employs a stochastic gradient descent rule as follows:

$$f_j(n+1)=f_j(n)-\mu r^*(n-j)e_{pb}(n)$$

$$h_j(n+1)=h_j(n)+\mu\phi(n-j)e_{bb}(n)$$

where $\mu$, $0<\mu<1$, is a step size, j is a parameter index, $r(\bullet)$ is the received signal, $\phi(\bullet)$ is feedback regressor data, $e_{bb}(n)$ is a baseband error term, and $e_{pb}(n)$ is a passband error term, wherein the FW filter operates in a passband and the FB filter operates at baseband.

34. The invention as recited in claim 24 wherein, for step (f), recursive update at time n+1 of at least one of the sets of FW parameters ($f_j(n)$) and FB parameters ($h_j(n)$) employs a stochastic gradient descent rule as follows:

$$f_j(n+1)=f_j(n)-\mu r^*(n-j)e_{bb}(n)$$

$$h_j(n+1)=h_j(n)+\mu\phi(n-j)e_{bb}(n)$$

where $\mu$, $0<\mu<1$, is a step size, j is a parameter index, $r(\bullet)$ is the received signal, $\phi(\bullet)$ is feedback regressor data, and $e_{bb}(n)$ is a baseband error term, wherein the FW filter operates at baseband and the FB filter operates at baseband.

35. The invention as recited in claim 24, wherein, for step (f), recursive update of the set of LPR filter parameters $g_j(n)$ uses an SA-OPA update rule and the set of FB filter parameters ($h_j(n)$) for the DFE employs an LPR-regularized DFE update rule for minimization of criterion $J_{reg}(h)$ as:

$$J_{reg}(h) = J_{combo}(h) + \lambda \sum_{j=1}^{N_g} |g_j(n) - h_j(n)|^2$$

where $J_{combo}$ (h) is a linear combination of CM and DD cost criteria.

36. The invention as recited in claim 24, wherein the received signal is carrier modulated by data in accordance with a vestigial sideband (VSB) format.

37. The invention as recited in claim 24, wherein the received signal is a digital television signal having its data encoded in accordance with an ATSC standard.

38. The invention as recited in claim 24, wherein data of the received signal includes a training sequence, and wherein step (e2) comprises the steps of:

(e2i) correlating a conjugated signal from the LPR filter with a local sequence;

(e2ii) detecting the training sequence; and (e2iii) generating an estimate for the set of FW parameters based on the correlation of step (e2i).

* * * * *

UNITED STATES PATENT AND TRADEMARK OFFICE
CERTIFICATE OF CORRECTION

PATENT NO. : 7,027,500 B1 Page 1 of 1
APPLICATION NO. : 10/016665
DATED : April 11, 2006
INVENTOR(S) : Raul A. Casas et al.

It is certified that error appears in the above-identified patent and that said Letters Patent is hereby corrected as shown below:

<u>Column 19,</u>
Line 62, replace "feedback filters," with -- feedback filter, --.

Signed and Sealed this

Fourth Day of July, 2006

JON W. DUDAS
*Director of the United States Patent and Trademark Office*